United States Patent
Abraham et al.

(10) Patent No.: US 9,414,044 B2
(45) Date of Patent: Aug. 9, 2016

(54) METHOD AND DEVICE FOR PROCESSING IMAGE DATA OF TWO SENSORS OF A STEREO SENSOR SYSTEM SUITABLE FOR CAPTURING IMAGES

(75) Inventors: Steffen Abraham, Hildesheim (DE); Wolfgang Niehsen, Bad Salzdetfurth (DE)

(73) Assignee: ROBERT BOSCH GMBH, Stuttgart (DE)

( * ) Notice: Subject to any disclaimer, the term of this patent is extended or adjusted under 35 U.S.C. 154(b) by 444 days.

(21) Appl. No.: 13/992,500

(22) PCT Filed: Nov. 8, 2011

(86) PCT No.: PCT/EP2011/069617
§ 371 (c)(1),
(2), (4) Date: Aug. 20, 2013

(87) PCT Pub. No.: WO2012/076274
PCT Pub. Date: Jun. 14, 2012

(65) Prior Publication Data
US 2013/0321588 A1 Dec. 5, 2013

(30) Foreign Application Priority Data
Dec. 7, 2010 (DE) .......................... 10 2010 062 496

(51) Int. Cl.
*H04N 13/02* (2006.01)
*H04N 13/00* (2006.01)

(52) U.S. Cl.
CPC ........... *H04N 13/02* (2013.01); *H04N 13/0239* (2013.01); *H04N 2013/0081* (2013.01)

(58) Field of Classification Search
CPC .............. H04N 13/02; H04N 13/0239; H04N 2013/0081
USPC .................................................. 348/42, 47
See application file for complete search history.

(56) References Cited

U.S. PATENT DOCUMENTS

2005/0077450 A1* 4/2005 Baer ................. H01L 27/14643
250/208.1
2008/0024596 A1 1/2008 Li et al.

FOREIGN PATENT DOCUMENTS

EP    1 408 703    4/2004
JP    7-107517     4/1995
(Continued)

OTHER PUBLICATIONS

Bradley D et al : "Synchronization and rolling shutter compensation for consumer video camera arrays," Computer Vision and Pattern Recognition Workshops, 2009. CVPR Workshops 2009. IEEE Computer Society Conference on, IEEE, Piscataway, NJ, USA. Jun. 20, 2009, pp. 1-8, XP031512373, ISBN : 978-1-4244-3994-2, Chapter 2.
(Continued)

*Primary Examiner* — Allen Wong
(74) *Attorney, Agent, or Firm* — Norton Rose Fulbright US LLP

(57) ABSTRACT

A method for processing image data of two sensors of a stereo sensor system that are suitable for recording images, each of the sensors being configured to record the image data section by section in sensor sections of the sensor that are situated at different positions. The method includes providing information on a geometrical offset between the positions of two sensor sections of the first sensor and the second sensor which have corresponding image data, and reading out image information of the first sensor and image information of the second sensor, the reading out taking place with reference to the positions of the sensor sections, from which the image data are read out, using the offset.

10 Claims, 3 Drawing Sheets

(56) References Cited

FOREIGN PATENT DOCUMENTS

| JP | 10-224823 | 8/1998 |
|----|-----------|--------|
| JP | 2006-270265 | 10/2006 |
| JP | 2008-123141 | 5/2008 |
| WO | 02/095681 | 11/2002 |
| WO | 2008/128205 | 10/2008 |
| WO | WO 2008128205 A1 * 10/2008 | ............. H04N 5/225 |
| WO | 2010015499 A1 | 2/2010 |

OTHER PUBLICATIONS

Trucco and Verri, Introductory Techniques for 3D Computer Vision, Springer Verlag, 1998.

* cited by examiner

METHOD AND DEVICE FOR PROCESSING IMAGE DATA OF TWO SENSORS OF A STEREO SENSOR SYSTEM SUITABLE FOR CAPTURING IMAGES

FIELD OF THE INVENTION

The present invention relates to a method and a device for processing image data of two sensors of a stereo sensor system, suitable for capturing images, which may be installed in a vehicle.

BACKGROUND INFORMATION

Stereo-video image processing is of ever more meaningful significance for recording the surroundings in driver assistance systems, for robotics and for additional applications of automation technology. Using a stereo-video system, the spatial position of objects within the recording range of a stereo-video system is able to be determined, so as to be able to detect pedestrians in a driver assistance systems, for example.

The stereo measurement from digital images is discussed in textbooks of image preparation (e.g. Trucco and Verri, Introductory Techniques for 3D Computer Vision, Springer Verlag, 1998). The basis for the stereo measurement is formed by the search for corresponding image sections between the left and the right sensor. By taking into account the optical imaging and the geometrical arrangement of the sensors, a 3D reconstruction may be made of the image sections.

In order to facilitate the search for corresponding image sections, there frequently follows an image rectification. It permits a search for corresponding image sections along the scanning lines.

Patent document WO 02/095681 A1 discusses a method in which a source image, that is distorted by a camera optical system, is converted to a rectified target image with the aid of a tabular mapping rule. In this context, to each source pixel in the source image, zero, one or a plurality of target pixels are assigned.

SUMMARY OF THE INVENTION

Against this background, the exemplary embodiments and/or exemplary methods of the present invention provide a method for processing image data of two sensors, suitable for capturing images, of a stereo sensor system, furthermore a device that uses this method, and finally a corresponding computer program and a computer program product according to the independent patent claims. Advantageous refinements are yielded from the respective dependent claims and the following description.

Images taken by two sensors of a stereo sensor system typically have an error in alignment, which means that an image of a real object recorded by the sensors is retrieved at a different geometrical position in the takes. According to the present invention, information on the error in alignment is used to optimize, on the one hand, the recording of image data by the sensors and, on the other hand, to optimize the reading out of the image data from the sensors. With respect to the reading out, different sections of the sensors may be read out simultaneously, when knowing the error in alignment. In comparison to known methods, in which equal sections of the sensors are read out simultaneously, the size of a temporary storage, in which the data read out are stored temporarily, may be reduced. In addition, the further processing may be speeded up. With respect to the recording of the image data, different sections of the sensors may be actuated simultaneously for recording the image data, if the error in alignment is known. This has the advantage that image data are simultaneously provided which have no error in alignment, or at least a reduced one.

The approach according to the exemplary embodiments and/or exemplary methods of the present invention may be used advantageously for hardware-based methods for 3D stereo measurement using a stereo video system.

In particular, a method may be implemented for the optimized reading out of a video sensor of the stereo video system. In this method, reading out takes place, for instance, of a right and a left image sensor, as a function of calibrating data. The image sensors may be read out, for example, as a function of the line error in alignment ascertained in a calibration process, using a line offset over time. Also, as a function of the line offset in the left and the right camera, present in a calibrating process, different sections of the sensor, so-called regions of interest (ROI's) are able to be read out. The advantages yielded by this are a reduction in the size required in the input buffer in stereo measuring hardware and a reduction in the 3D measuring errors when using rolling shutter sensors for the stereo measuring.

The exemplary embodiments and/or exemplary methods of the present invention provides a method for processing image data of two sensors of a stereo sensor system suitable for image recording, each of the sensors being configured to record the image data section by section in sensor sections of the sensor situated in different positions, the method including the following steps:

providing information on an error in alignment between the positions of two sensor sections of the first and the second sensor which have corresponding image data; and reading out image information of the first sensor and an image information of the second sensor, the reading out taking place with reference to the positions of the sensor sections from which the image data are read out, having the error in alignment.

The stereo sensor system may be a stereo video system having two video sensors. The spatial position of objects in the sensing range of the sensors is able to be determined using a stereo video system. The stereo sensor system may provide data for a driver assistance system of a vehicle, for example. The sensors may capture image data, which image a real environment recorded by the sensors, by sections, for instance, line by line.

Each image information may include one or more brightness values. Consequently, the sensor sections may be lines, and the position of a sensor section may be a line number. The sensor may be identical and particularly may have the same type, number and situation of sensor sections. Thus, two sensor sections respectively of the two sensors may correspond with respect to their position within the sensors. Each sensor section may have a plurality of image points. Each image point may include an image information which images a certain range of the environment recorded by the sensor. The individual sensor sections are able to record the image data simultaneously or successively to one another in time. With reference to the error in alignment, by corresponding image data one should understand such image data that image an identical or an approximately identical range of the environment recorded by the sensors. Thus, corresponding image data correspond with regard to their image content. The information on the error in alignment may represent information which was ascertained in a calibrating procedure.

The information may be stored in a memory and read out from the latter. The error in alignment may define a difference between the positions of two sensor sections which have image points having corresponding image data. Starting from a position of a sensor section of the first sensor, and using the error in alignment, a position of a sensor section of the second sensor may be determined having image information corresponding to the sensor section of the first sensor. If the sensor sections are arranged by line, the error in alignment may state a number of lines. The image data of the first sensor and of the second sensor may be read out directly from the sensor or from a temporary storage. The image data of the first sensor and of the second sensor may be read out within an in-common reading out step.

For instance, the image information of the second sensor may be read out directly before, in time, simultaneously, or directly after, in time, the reading out of the image data of the first sensor. Consequently, image data are read out from different positions of the two sensors in one reading-out step. Thus, already because of the reading out, an association takes place of the corresponding image data. The image data read out may be processed further directly or may be stored in a temporary memory for further processing. For instance, based on the read-out and, with respect to its image content, corresponding image data, a stereo measurement may be carried out.

According to one specific embodiment, the method may include a step of determining the error in alignment. The error in alignment may occur based on a comparison between image data from sensor sections of the first sensor and image data from sensor sections of the second sensor. Sensor sections having corresponding image contents may be ascertained by the comparison and the directional distance of such sensor sections may be stored as the error in alignment. The error in alignment may be determined once, continually or, for instance, at each putting into operation of the stereo video system.

In the step of reading out, image information of the first sensor is able to be read out only from the first sensor section and the image information of the second sensor is able to be read out only from the second sensor section, the situation of the first sensor section within the first sensor differing in regard to the situation of the second sensor section within the second sensor. The first sensor section and the second sensor section may be of the same size. The first sensor section and the second sensor section advantageously have corresponding image contents. In the ideal case, the sensor sections read out may be processed directly in a subsequent step, without rectification being necessary.

In the process, the method may include a step of determining a displacement between a first image point within the first sensor section and a second image point within the second section, the first image point and the second image point corresponding to each other with reference to a recorded image information. In this instance, the first range of the first sensor section may be displaced by the value of the displacement with respect to the second range of the second sensor section. In this way, one is able to determine an error in alignment between ranges corresponding with reference to their image data within corresponding sensor sections of the two sensors.

According to one specific embodiment, the method may include a step of providing a first triggering signal, which is configured to trigger the recording of the image information of the first sensor by a sensor section situated at a first position of the first sensor. The method may also include a step of providing a second triggering signal, time-wise after or before the step of providing the first triggering signal, the second triggering signal being configured to trigger the recording of the image information of the second sensor by a sensor section situated at the first position of the second sensor. Consequently, corresponding image data, which are read out together in the subsequent step of reading out, may have been recorded at different points in time. In this case, a temporary storage of recorded image data may be required.

Alternatively, the method may include a step of providing a triggering signal, which is configured to trigger a simultaneous recording of the image information of the first sensor by a sensor section situated at a first position of the first sensor and of the image data of the second sensor by a sensor section situated at a second position of the second sensor, the error in alignment existing between the first position and the second position. Consequently, corresponding image data, which are read out together in the subsequent step of reading out, may be recorded simultaneously. In this case, a temporary storage of recorded image data is not required.

According to one specific embodiment, in which the sensor sections are situated by line, in the step of reading out, the image information of the first sensor may be read out from a line of the first sensor and the image information of the second sensor may be read out from a line of the second sensor. In this case, the error in alignment is able to determine a difference between a line number of the line of the second sensor and the line of the first sensor.

The method may include at least one additional step of reading out an additional image information of the first sensor and an additional image information of the second sensor. In this instance, the reading out takes place with reference to the additional positions of the additional sensor sections, from which the additional image data are read out, having the error in alignment. Consequently, in each case image data, that are situated in a displaced manner, may be continually read out from both sensors. In each step of reading out, for example, image data may be read out from a sensor section which borders directly on a sensor section from which reading out took place in the preceding reading-out step.

The exemplary embodiments and/or exemplary methods of the present invention further provides a device for processing image data of two sensors of a stereo sensor system, suitable for image recording, each of the sensors being configured to record the image data section by section in sensor sections of the sensor situated in different positions, the method including the following steps:

a providing device for providing information on a geometrical error in alignment between the positions of two sensor sections of the first and the second sensor which have corresponding image data; and a reading-out device for reading out image information of the first sensor and image information of the second sensor, the reading out taking place with reference to the positions of the sensor sections from which the image data are read out, having the error in alignment.

This embodiment variant of the present invention in the form of a device may also be used to quickly and efficiently achieve the object on which the present invention is based. The device may be a part of the stereo sensor system or a part of a post-connected processing unit. In the case at hand, by a device one may understand an electrical device which processes sensor signals and outputs control signals as a function thereof. The device may have an interface configured as hardware and/or software. In a hardware implementation, the interfaces may be part of a so-called system ASIC, for instance, which contains various functionalities of the device. However, it is also possible for the interfaces to consist of discrete, integrated switching circuits or to be at least partially made up of discrete components. In a software implementation, the interfaces could be software modules, which are provided on a microcontroller, for example, in addition to other software modules.

A computer program product is also of advantage, having program code that may be stored on a machine-readable carrier such as a semiconductor memory, a hard-disk memory or an optical memory, which is used to implement the method according to one of the specific embodiments described above, when the program is executed on a signal processing system such as a computer or a corresponding unit.

In the following text, the exemplary embodiments and/or exemplary methods of the present invention will be explained in greater detail with reference to the attached drawings and by way of example.

DETAILED DESCRIPTION

Figure 1:
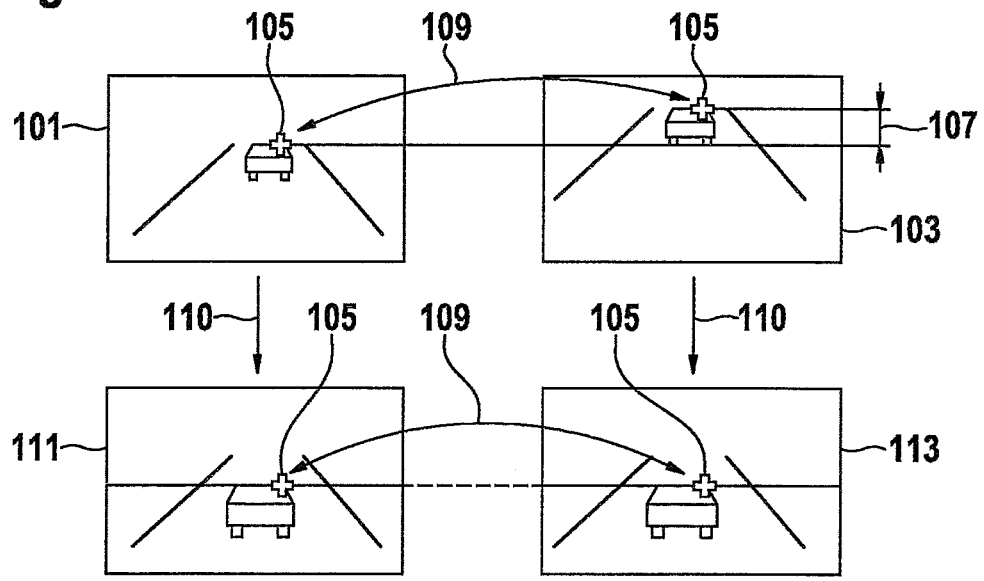
FIG. 1 shows a principle of stereo measurement having image rectification.

In the subsequent description of exemplary embodiments of the present invention, the same or similar reference numerals are used for the elements that are shown in the various figures and act similarly, a repeated description of these elements having been dispensed with.

FIG. 1 shows a principle of stereo measurement having image rectification. An original sensor image 101 of a left sensor is shown and an original sensor image 103 of a right sensor of a stereo image recording system. Sensor image 101 may be a left video image and sensor image 103 may be a right video image. In sensor images 101, 103 an object in the form of a vehicle may be recognized, respectively. In sensor images 101, 103 the vehicle is located at different positions. Thus, between corresponding regions of the object, such as right upper corner region 105 of the vehicle, there is a line offset 107. Consequently, in sensor images 101, 103, no stereo correspondence 109 is present within the same scanning line.

By image rectification 110, a rectified image 111 is generated from sensor image 101 and an additional rectified image 113 is generated from additional sensor image 103. In images 111, 113, right upper corner regions 105 of the vehicle are located in the same line, so that stereo correspondence 109 is present within the same scanning line.

Figure 2:
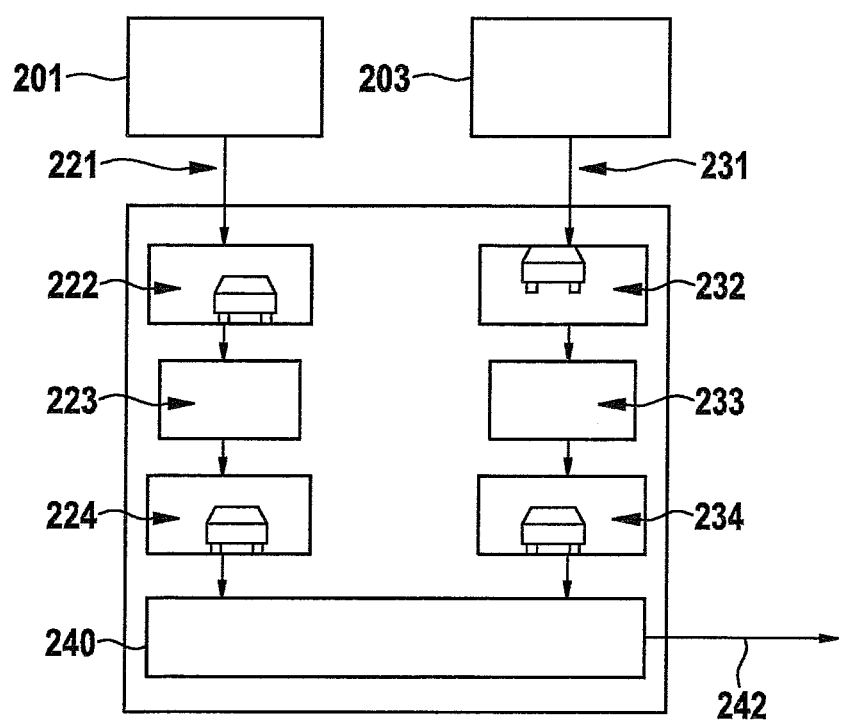
FIG. 2 shows a principle design of hardware for stereo measurement.

FIG. 2 a principle design of hardware for stereo measurement. Two image sensors 201, 203 are shown. Image sensor 201 may be a left image sensor and image sensor 203 may be a right image sensor. Image data of image sensor 201 are provided via a serial line 221 of the left sensor to a left input buffer 222, and subsequently to a logic circuit 223 for rectification left and subsequently to a line buffer 224 for the rectified image left. The position of the vehicle is changed by the rectification. Image data of image sensor 203 are provided via a serial line 231 of the right sensor to a right input buffer 232, and subsequently to a logic circuit 233 for rectification right and subsequently to a line buffer 234 for the rectified image right. The position of the vehicle is changed by the rectification. Data from line buffers 224, 234 are provided to a logic circuit 240 for disparity measurement, which is configured to generate 3D coordinates 242.

In a hardware-supported real time stereo measurement, a rectification takes place as a rule, that is, a rectification of original sensor images 101, 103 into rectified images 111, 113. In rectified images 111, 113, a correspondence search may subsequently take place of features between the left and the right image along a scanning line. This is of advantage for implementation in hardware, such as an FPGA or an ASIC. FIG. 1 shows the sequence schematically.

The processing of video image data in a stereo hardware system, such as an FPGA, is organized sequentially by line.

FIG. 2 shows the schematic design of a corresponding hardware.

For each sensor 201, 203 there is a serial data line 221, 231 in which the camera image data, that is, the brightness values, are transmitted from sensor 201, 203 to the evaluation hardware, for instance, using LVDS (low voltage differential signaling). In the evaluation hardware, there is an input buffer 222, 232, in which a limited number of lines of the input images is temporarily stored. A rectification logic circuit 223, 233 reads the image data individually from input buffers 222, 232, and generates the rectified image data. These are stored in a next data buffer 224, 234 by line. Between the lines of intermediate buffer 224, 234 having the rectified image data of the left and right camera image, the stereo measurement, and lastly, the 3D reconstruction takes place.

The mechanical design of a stereo camera system takes place practically with limited accuracy of the alignment of the cameras with respect to each other. For this reason, among other things, a calibration of the stereo camera system ahead of time is required, i.e. the determination of the geometrical position of the cameras with respect to each other and the optical distortion, for a meaningful stereo measurement. During the evaluation, the image rectification then compensates for the position and the imaging errors while the calibration data are used.

In the usual stereo systems at this time, as a rule, the images of the left and the right camera are taken synchronously, in order to make possible an accurate stereo measurement of dynamically moved objects. Furthermore, connected with this is a synchronous serial transport of the scanning lines from the left and the right sensor to the processing hardware for stereo measurement.

For sequential processing according to FIG. 2, this means that, for a geometrical positional deviation between the left and the right camera, an offset occurs of the corresponding lines, as is shown in FIG. 1. This line offset increases the input buffer required in the rectification hardware. This is a disadvantage, since a memory in an FPGA implementation is costly.

The approach according to the exemplary embodiments and/or exemplary methods of the present invention makes possible reducing the required memory in the input buffer of the hardware.

If CMOS sensors having a rolling shutter mode are used for the image taking, the image taking occurs for each line at a different point in time. This is shown schematically in FIGS. 6 and 7. If the line offset, based on an unfavorable mounting of the cameras, is large, the corresponding features required for the stereo measurement are taken at different points in time. Especially for stereo measurement from the passenger car at high speeds, this leads to the problem that, based on the rapid motion of image features in the image, a correspondence measurement between a left and a right scanning line will not work.

The approach according to the exemplary embodiments and/or exemplary methods of the present invention is intended to provide for the reduction in the offset in time of the measurement of corresponding image features when using rolling shutter sensors for the stereo measurement, and thus a reduction in the error of the 3D stereo measurement. The method for stereo measurement of point features and their correspondence point association is shown schematically in FIG. 1. What is sketched is the procedure for a stereo image pair.

Upper stereo image pair 201, 203 shows the original image pair after being taken by the camera. Based on mechanical inaccuracies in the mounting of the camera and by optical distortion, corresponding corners 105 of the imaged back of the vehicle is offset by several lines. Line offset 107 is shown schematically in the graphic illustration.

After rectification 110 of original images 101, 103 using calibration parameters ascertained individually especially for the camera system, the corresponding image features 105 in the left and the right rectified image 111, 113 are each on one scanning line. The correspondence search may now be made on one line, which greatly simplifies a real time implementation in computing hardware. The design of hardware for the stereo measurement is shown in FIG. 2.

From the two image sensors 201, 203, respectively, the image contents are read sequentially into the respective input buffers 222, 232 of the hardware. An input buffer 222, 232 is made up of memories for a plurality of scanning lines, and thus includes a section of the input image.

A logic system 223, 233 for rectifying the images sequentially fills rectification buffers 224, 234, again, line by line. A next logic system 240 carries out a line by line stereo measurement between left and right rectification buffers 224, 234, and generates displacement measurements. From this, 3D coordinates 242 of the image features are able to be derived.

Based on mechanical manufacturing tolerances, the accuracy of the mounting of the stereo system is limited. A line offset of the nonadjusted stereo camera system is unavoidable. In the hardware concept shown in FIG. 2 having synchronous reading out of image sensors 201, 203, the line offset requires a necessary enlargement of input buffers 222, 232 in the hardware by the corresponding line offset. According to the exemplary embodiments and/or exemplary methods of the present invention, the size of input buffers 222, 232 may be reduced by reading out image sensors 201, 203 offset in time. The control of the offset in time takes place as a function of the calibrating data.

Figure 3:
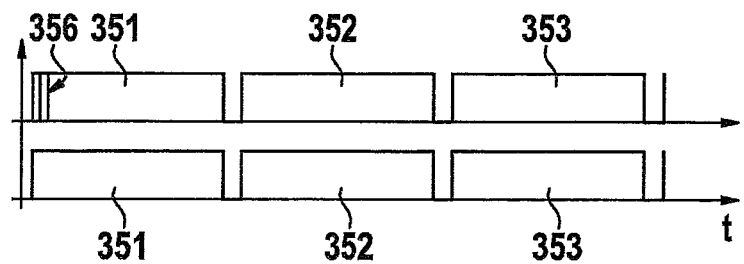
FIG. 3 shows a representation of synchronous reading out of two image sensors.
Figure 4:
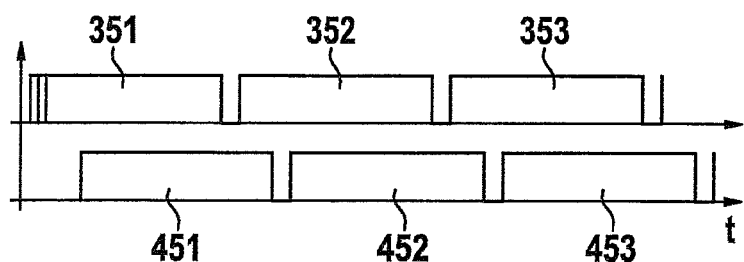
FIG. 4 shows a representation of time-displaced reading out of two image sensors.

FIGS. 3 and 4 schematically show the sequence of reading out on camera lines 221, 231 shown in FIG. 2.

FIG. 3 shows a signal sequence, during reading out of the image sensors, on the serial data lines in response to a synchronous reading out of the left and the right image sensor. The upper sequence is associated with the left sensor and the lower sequence with the right sensor. Over time t, simultaneously in each case image data of a line 1 351, a line 2 352, a line 3 353, etc., of the left and the right sensor are read out and transmitted via the serial data lines. Each of lines 351, 352, 253 has a plurality of brightness values 356, of which, for the sake of clarity, only two are shown at the beginning of line 351.

What is shown schematically is the generally usual procedure for the reading of data in a stereo evaluation hardware. The two sensors are read out serially at synchronous clock pulses. The same lines from the left and the right sensor, respectively, are transmitted synchronously on the lines.

Correspondingly to FIG. 3, FIG. 4 shows a signal curve during the reading out of the image sensor on the serial data lines in response to a reading out, offset in time, of the image sensors as a function of calibrating data, according to an exemplary embodiment of the present invention. The upper sequence is associated with the right sensor and the lower sequence with the right sensor. Over time t, with respect to the left sensor, a line 1 351, a line 2 352, a line 3, 353, etc., are read out. In parallel to this, with respect to the right sensor, a line j 451, a line j+1 452, a line j+2, 453, etc., are read out. Thus, in one step of reading out, lines 351, 451, in a further step of reading out, lines 352, 452, and in a still further step of reading out, lines 353, 453 are read out.

An optimized procedure according to the exemplary embodiments and/or exemplary methods of the present invention is shown. Geometrically approximately corresponding lines are synchronously transmitted from the image sensor. Which lines approximately correspond to one another is calculated from the calibrating data and may be individual for each sensor design. The control of the offset in time may take place using the hardware itself. This permits a reduction in the size of the input buffer.

Figure 5:
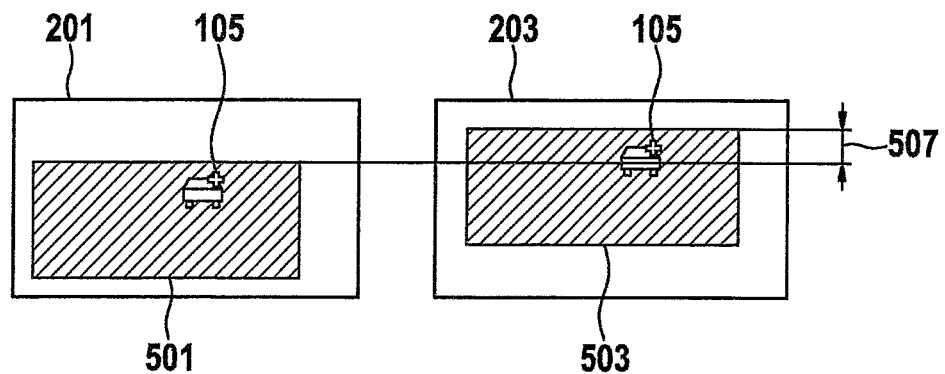
FIG. 5 shows a representation of the reading out of regions of two image sensors.

FIG. 5 shows a reading out of regions 501, 503 from a left image sensor 201 and a right image sensor 203 for the stereo measurement as a function of calibrating data, according to one exemplary embodiment of the present invention. Regions 501, 503 are of the same size and cover different sensor regions of sensors 201, 203. In this context, regions 501, 503 are displaced with respect to each other with reference to the lines of sensors 201, 203. With reference to region 501 of left sensor 201, region 503 of right sensor 203 is displaced upwards by a distance 507. Distance 507 states a number of lines, in this context. In addition, regions 501, 503 may also be displaced with respect to each other, with reference to the gaps of sensors 201, 203. Within regions 501, 503, corresponding image contents 105 are situated at identical or nearly identical positions within regions 501, 503.

Many CMOS sensors permit the selective reading out of regions 501, 503 of image sensors 201, 203. For the stereo measurement, this makes it possible, as a function of the calibrating data, specifically to select the regions in left and right sensor 201, 203 individually in such a way that, to the greatest extent possible, between regions 501, 503, in the left and the right image, no line offset occurs, or only a slight one.

This also makes possible a reduction in the size of the stereo hardware. A corresponding procedure is shown schematically in FIG. 5.

Figure 6:
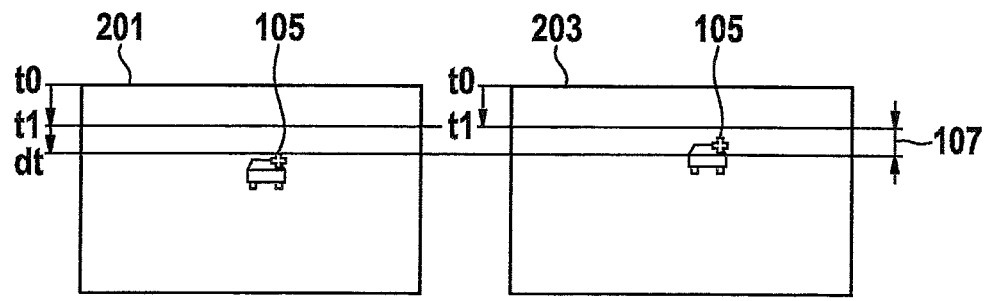
FIG. 6 shows a representation of a synchronous image recording by two image sensors.
Figure 7:
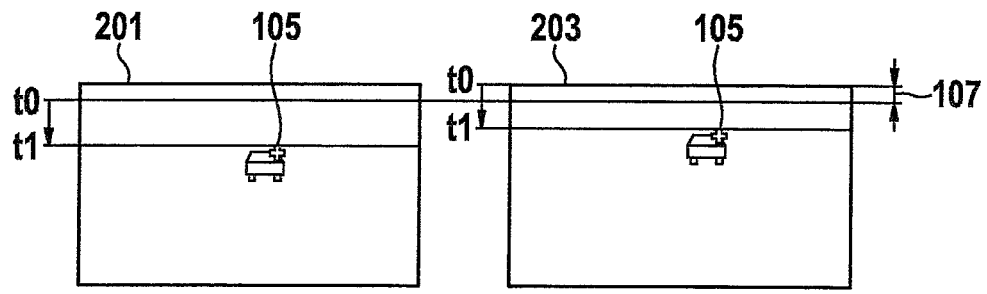
FIG. 7 shows a representation of an image recording displaced in time by two image sensors.

In response to the use of rolling shutter sensors, the lines of the imager are illuminated sequentially in time and read out. FIGS. 6 and 7 show this schematically.

FIG. 6 shows a sequence in time of image taking using a rolling shutter sensor, in a schematic representation, in a synchronous take having a left and a right image sensor. What is shown is an image sensor left 201 and an image sensor right 203, by which in each case the vehicle having corner region 105 is recorded. Corner region 105, in turn, is situated offset by a number of lines 107. Furthermore, taking times t0, t1 and time difference dt are shown. What is shown is a synchronous illumination and reading out of left and right sensor 201, 203. The start of the line by line illumination takes place in each case at time t0. Subsequently, the lines of sensor 201, 203 are illuminated one after the other and read out. This is indicated by the arrow at the left next to the respective image.

For a stereo design having the geometrical line offset shown in FIG. 1, this leads to image feature 105, shown in the left image, being taken by a time dt later than in the right image.

In practice, this means the following. For an image frequency of 25 Hz and an image resolution of 500 lines, the clock pulse period for a scanning line amounts to ca. 80 microseconds. In response to a line offset of 20 scanning lines, the offset in time of the illumination between the left and the right scanning line amounts to 1.6 milliseconds. Particularly in the case of objects moving rapidly in the image, for instance, a motor vehicle in the nearfield, a vertical speed of motion of an object of only 25 pixels per image to image already leads to a parallax error of 1 pixel in the rectified image. This means that corresponding features 105 of dynamic objects, even after rectification, are still offset by one scanning line. The stereo measurement is thereby made more difficult.

Corresponding to FIG. 6, FIG. 7 shows a sequence in time of image taking using a rolling shutter sensor in a schematic representation, in a shutter mode offset in time, according to an exemplary embodiment of the present invention.

What is shown is an image sensor left 201 and image sensor right 203, by which, in turn, in each case, the vehicle having corner region 105 is recorded.

Because of the working, offset in time, of the rolling shutter method in the stereo system, the effect described with the aid of FIG. 6, that corresponding features 105 of dynamic objects are still offset anyhow after the rectification, may be advantageously reduced. The offset in time should be selected as a function of calibrating information, as is shown in FIG. 7. The start of taking the image of left sensor 201 is delayed by time dt. Delay dt, in turn, is calculated from the calibrating data and may be fixed individually for each stereo system.

Such a procedure improves the accuracy and reliability of the stereo measurement when using rolling shutter sensors.

Figure 8:
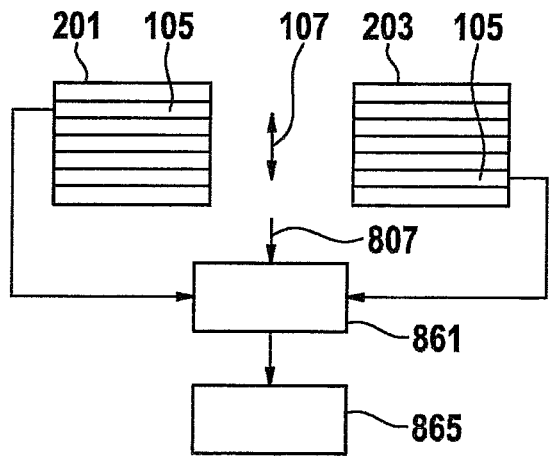
FIG. 8 shows a flow chart of a method for processing image data.

FIG. 8 shows a schematic representation of a method for processing image data of two sensors 201, 203, that are suitable for processing image data, of a stereo sensor system. Sensors 201, 203 are configured to record image data section by section in sensor sections situated at different positions. As sensor sections, seven lines are shown in each case, for example. In order to compensate for an image offset between takes of sensors 201, 203, image data are read out offset to each other from the sensor sections of sensors 201, 203. The reading out is controlled by a reading-out device 861. Read-out device 861 is configured to receive information via image offset 107, and based on this, in one reading-out step, to read out a sensor section 201 and a sensor section of sensor 203. It is shown, for example, that reading out device 861, in one reading-out step, reads out image information from the second line of sensor 201 and image information from the sixth line of sensor 203. The second line of sensor 201 and the sixth line of sensor 203 each show corresponding image content 105. According to this exemplary embodiment, sensor sections are thus read out having an offset of four lines. In a following reading-out step, correspondingly, image information from the subsequent third line of sensor 201 and image information from the subsequent seventh line of sensor 203 are read out. The image data read-out may be output to a processing device 865, and processed further by it or evaluated.

The image data may be recorded by the sensor sections and stored temporarily. In this case, reading-out device 861 may be configured to read out the image data from a temporary storage. Alternatively, reading-out device 861 may be configured to trigger the recording of the image data by a corresponding sensor section. In this case, reading-out device 861 is able to read out the image data directly from the sensor sections.

According to one exemplary embodiment, in each case only subregions of the sensor sections are able to be read out by reading-out device 861. In this case, reading-out device 861 is configured to receive, besides offset 807, additional information on an offset within the individual sensor sections, in the horizontal direction in this case, and responding to this, to read out only corresponding subregions. If there is an offset of one-quarter of a line length, for example, the left half of the second line of left sensor 201 and the two middle quarters of the sixth line of right sensor 203 could be read out, for instance, in the read-out step shown.

The technical approaches, according to the exemplary embodiments and/or exemplary methods of the present invention, of the reading out, offset in time, of the image sensors or of the selection of regions as a function of the calibrating data may be used, for instance, in connection with assistance systems in the motor vehicle.

The exemplary embodiments described and shown in the figures are chosen only for the sake of examples. Different exemplary embodiments may be combined completely with one another or with reference to individual features. One exemplified embodiment may also be supplemented by the features of a further exemplary embodiment. Moreover, method steps according to the present invention may be carried out repeatedly as well as in a different sequence from the one described.

What is claimed is:

1. A method for processing image data, which are of two sensors of a stereo sensor system, that are suitable for recording images, each of the sensors being configured to record the image data section by section in sensor sections of the sensors situated in different positions, the method including:
providing information on a geometrical offset between the positions of two sensor sections of the first sensor and the second sensor, which have corresponding image data; and
reading out image information of the first sensor and image information of the second sensor, the reading out taking place with reference to the positions of the sensor sections, from which the image data are read out, using the offset.

2. The method of claim 1, further comprising:
determining the offset based on a comparison between image data from sensor sections of the first sensor and image data from sensor sections of the second sensor.

3. The method of claim 1, in which, in the reading out operation, the image information of the first sensor is read out only from one sensor section and the image information of the second sensor is read out only from a second sensor section, wherein a geometrical situation of the first sensor section within the first sensor differs with reference to a geometrical situation of the second sensor section within the second sensor.

4. The method of claim 3, further comprising:
determining a displacement between a first image point within the first sensor section and a second image point within the second sensor section, wherein the first image point and the second image point correspond with each other with reference to a recorded image information.

5. The method of claim 1, further comprising:
providing a first triggering signal, which is configured to trigger a recording of the image information of the first sensor by a sensor section situated at a first position of the first sensor; and providing a second triggering signal, after or before, in time, the step of providing the first triggering signal, wherein the second triggering signal is configured to trigger a recording of the image information of the second sensor by a sensor section situated at a first position of the second sensor.

6. The method of claim 1, further comprising:
providing a triggering signal, which is configured to trigger the simultaneous recording of the image information of the first sensor by a sensor section situated at a first position of the first sensor and the image data of the second sensor by a sensor section situated at a second position of the second sensor, the offset existing between the first position and the second position.

7. The method of claim 1, wherein, in the reading out, the image information of the first sensor is read out from a line of the first sensor and the image information of the second sensor is read out from a line of the second sensor.

8. The method of claim 1, further comprising:
reading out additional image information of the first sensor and additional image information of the second sensor, wherein the reading out takes place with reference to the additional positions of the additional sensor sections, from which the additional image data are read out, using the offset.

9. A device for processing image data of two sensors of a stereo sensor system that are suitable for image recording, wherein each of the sensors is configured to record the image data section by section in sensor sections of the sensor situated at different positions, comprising:

a providing device for providing information on a geometrical offset between positions of two sensor sections of the first sensor and the second sensor, which have corresponding image data; and a reading-out device for reading out image information of the first sensor and image information of the second sensor, the reading out taking place with reference to the positions of the sensor sections, from which the image data are read out, using the offset.

10. A non-transitory computer readable medium having a computer program, which is executable by a processor, comprising:

a program code arrangement having program code for processing image data, which are of two sensors of a stereo sensor system, that are suitable for recording images, each of the sensors being configured to record the image data section by section in sensor sections of the sensors situated in different positions, by performing the following:

providing information on a geometrical offset between the positions of two sensor sections of the first sensor and the second sensor, which have corresponding image data; and reading out image information of the first sensor and image information of the second sensor, the reading out taking place with reference to the positions of the sensor sections, from which the image data are read out, using the offset.

* * * * *